Aug. 9, 1938. C. A. OVERGUARD 2,126,343
PIPE THREADING DIE OR TOOL
Filed Oct. 8, 1937 2 Sheets-Sheet 1

INVENTOR.
CHRISTIAN A. OVERGUARD
BY
ATTORNEY.

Aug. 9, 1938.  C. A. OVERGUARD  2,126,343

PIPE THREADING DIE OR TOOL

Filed Oct. 8, 1937  2 Sheets-Sheet 2

INVENTOR.
CHRISTIAN A. OVERGUARD
BY
HisATTORNEY.

Patented Aug. 9, 1938

2,126,343

UNITED STATES PATENT OFFICE 2,126,343

PIPE THREADING DIE OR TOOL

Christian A. Overguard, North Olmsted, Ohio, assignor of one-half to Edwin Swanson Application October 8, 1937, Serial No. 167,901

6 Claims. (Cl. 10—120.5)

This invention relates to pipe threading apparatus and more particularly to an improved means of supporting and driving a die head in apparatus of this type.

I am familiar with prior pipe threading apparatus wherein the die head is moved axially within a work-holder whereby thread-chasers supported by the die head will cut thread on either a cylindrical or tapered surface. Due to the fact that the thread chasers must be permitted to move radially to care for tapered surfaces, and that both axial and rotary movement must be imparted to the die head relative to the work-holder, it is difficult to maintain the die head in proper alignment and prevent chattering and the like.

I have devised an improved pipe threading apparatus of the above type including a work-holder within which a die head supporting thread chasers is mounted and wherein the die head is maintained in contact with the work-holder at three spaced points thereby rigidly maintaining the die head in proper alignment and eliminating the tendency to chatter and to form imperfect threads. Additionally, I have provided improved means for rotating the die head by means mounted externally of the work holder or die housing which is of relatively simple construction affording clear visibility of the work being operated upon and permitting egress of chips and the like. The die head is maintained sealed with the die housing or work holder, both at the front and rear portions of the die head and thereby preventing the ingress of chips or other foreign material to the threadedly engaged portions of the die head and work holder which effect relative axial movement therebetween and disposed intermediate the sealed portions.

It is a primary object of my invention to provide an improved pipe threading apparatus including a work holder and die head, and wherein the die head is maintained substantially sealed with the work holder forwardly and rearwardly.

Another object of my invention is to provide improved means for reversibly driving the work holder in apparatus of the above type.

Other objects of my invention and the invention itself will become increasingly apparent from a consideration of the following description of the drawings wherein.

Figure 1:
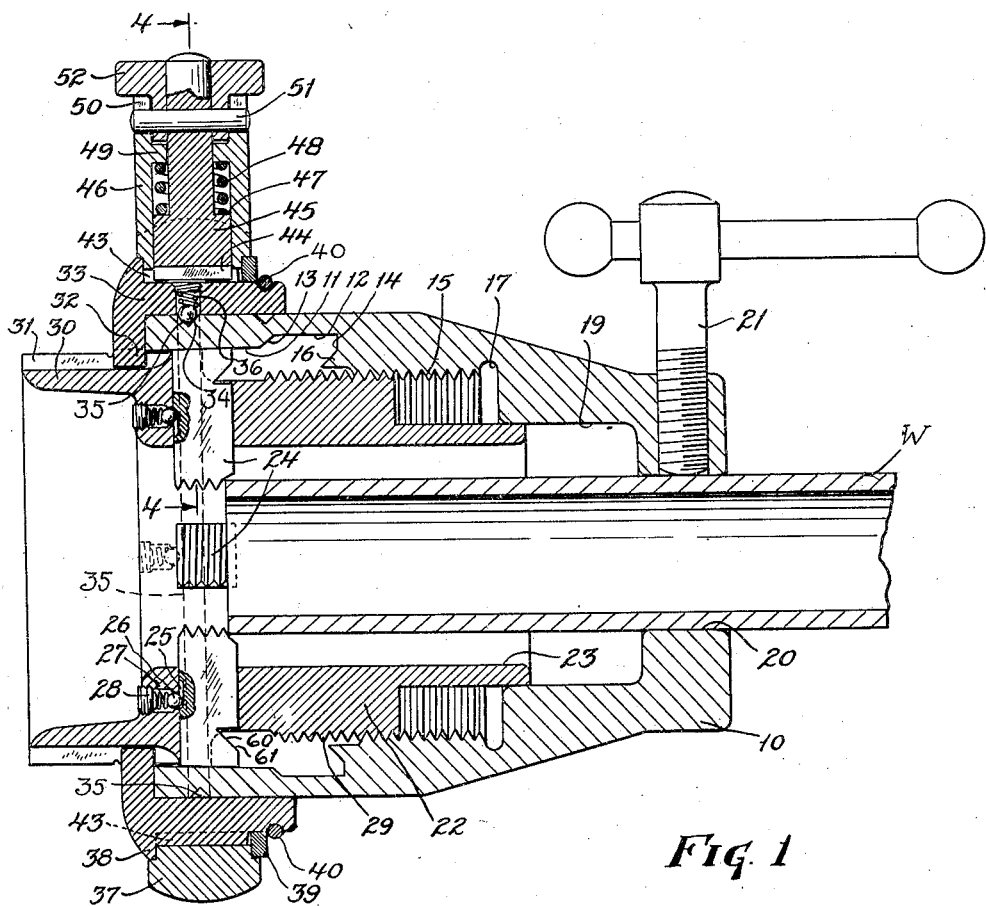
Fig. 1 is a longitudinal sectional view of a pipe threading apparatus embodying my invention.
Figure 2:
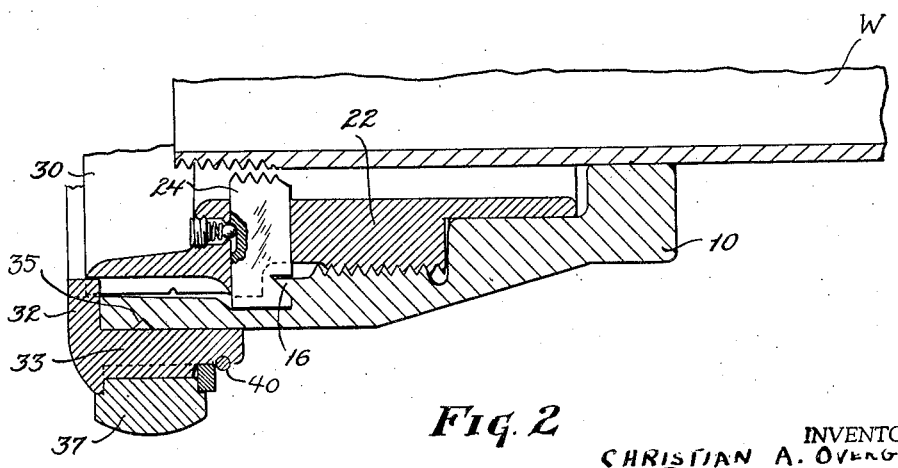
Fig. 2 is a fragmentary sectional view similar to Fig. 1 showing parts in a different position.
Figure 3:
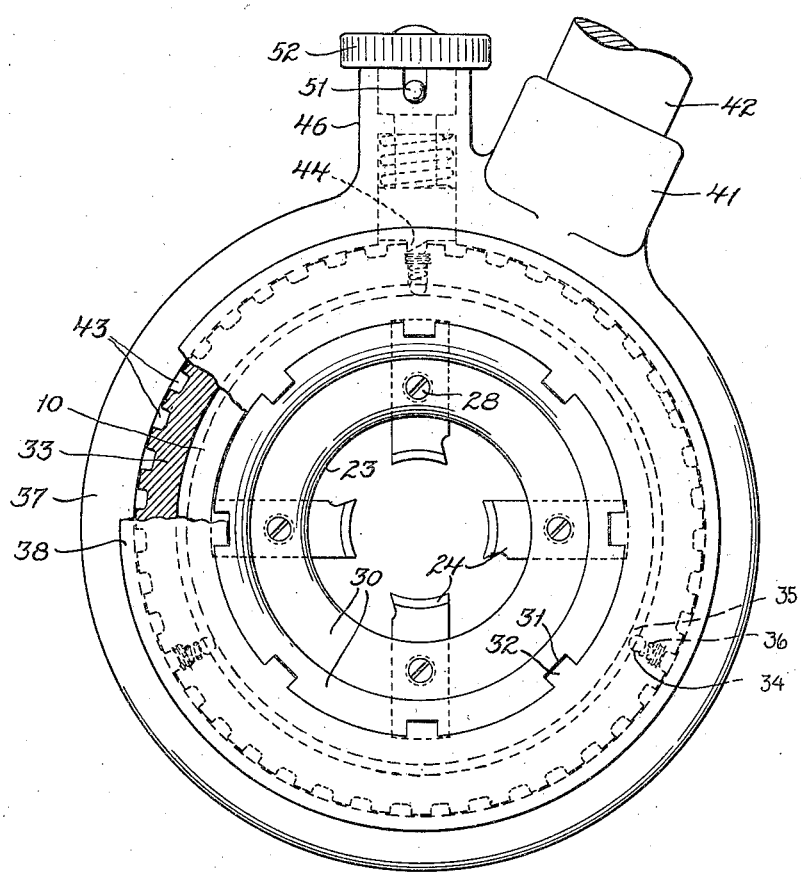
Fig. 3 is an end elevational view of the apparatus of Fig. 1.
Figure 4:
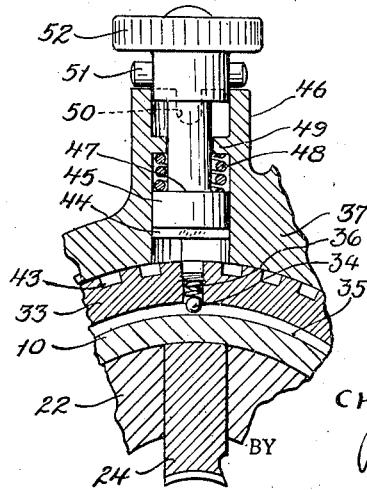
Fig. 4 is a section along line 4—4 of Fig. 1.

Referring now to the drawings, I have indicated generally at 10 a work holder or die housing of generally tubular form having a tapered bore 11 at its forward end extending into an enlarged bore 12, the bores 11 and 12 preferably being joined by a frusto-conical shoulder 13. The large bore 12 terminates rearwardly in a radially extending shoulder 14 joining a threaded portion 15 of reduced diameter forming the lead thread for the die head. An annular generally V-shaped ridge is provided on the face of radial shoulder 14 for a purpose to be later described. The usual clearance groove 17 is provided at the rear termination of the lead portion or threaded portion 15. Beyond the threaded portion 15 the work holder is further reduced in diameter to provide a cylindrical bored portion 19 extending to a further reduced bore 20 through which the work to be operated upon, such as a pipe, bolt or the like, may be projected and securely clamped by a work-holder screw 21.

The manner of holding the work constitutes no essential part of my invention and any well known means may be employed whereby the work is projected into the work holder any desired amount and rigidly supported in axial alignment with the die holder and thread chasers. It is customary to rigidly support the work holder upon the bed of the machine by any suitable means and rotate the die head but it is understood that my invention is equally applicable if the die head and thread chasers are rigidly supported and the work holder and work are rotated.

Telescoped within the work holder 10 is a generally tubular die head 22 provided with a cylindrical bore 23 and provided with a plurality of perforations adjacent the forward end of the die to receive thread chasers generally indicated at 24. The thread chasers are preferably square-form in cross section and are radially movable within the perforations in the die head to cut a tapered thread on the work, although they may be maintained fixed against radial movement when a cylindrical thread is desired. In order to maintain thread chasers within the die head, I preferably provide elongated pockets 25 therein to receive balls 26 which are maintained within the pockets by any suitable means, such as springs 27, pressing thereagainst and trapped by plugs 28. The die head also comprises an externally threaded portion 29 engaging the threaded portion 15 of the die housing whereby relative rotation between the die head and the die housing will effect axial movement therebetween. In order to rotate the die head, I have provided a forward generally cylindrical portion 30 provided with a plurality of axially extending splines 31. The splines 31 are engaged by a tongue 32 provided on a driver ring 33 rotatably mounted on the work holder ring 33 rotatably mounted on the work holder and restrained against axial movement by balls 34 pressed into an annular V-shaped groove 35 in the work holder by springs 36. The springs 36 may be trapped in any suitable manner to exert compressive force on the balls 34.

The die head will thus be permitted to move axially of the work holder and the driver ring and to impart rotary movement to the driver ring 33 and die head I employ a ratchet ring 37. The ratchet ring 37 is rotatably mounted on the driver ring 33 and is restrained against axial movement by providing a radial flange 38 on the driver ring abutting a recess formed in the ratchet ring 37 and an annular collar 39 abutting a second recess formed in the ratchet ring, the collar 39 being maintained in place by a snap ring 40. The ratchet ring is provided with a handle hole 41 receiving a handle 42 for imparting rotation to the ratchet ring although any desired driving means other than that shown may be employed.

To drivingly inter-connect the ratchet and driver ring I provide a plurality of axially extending grooves 43 on the driver ring engageable by a dog 44. The dog 44 is integral with a plunger 45 reciprocable in a housing 46 integral with the ratchet ring. The plunger 45 is provided with a shoulder 47 which engages a compression spring 48 engaging a horizontal flange 49 on the housing 46. The housing 46 is slotted at diametrically opposite sides as indicated at 50 to receive a pin 51 whereby the plunger may be lifted against spring 48 by a preferably knurled knob 52 to rotate the plunger and dog through 180° and effect reverse movement of the die head for cutting a left hand thread or reversing the movement of the die head. The thread chasers are each provided with a groove 60 preferably having a tapered surface 61 whereby the thread chasers reaching the frusto-conical shoulder 13 of the work holder will be permitted to be retracted radially outwardly and be received in the enlarged bore 12 of the work holder and eventually engage the V-shaped ridge 16 of the work holder to be held in the retracted position.

It will be noted that the die holder is supported forwardly in contact with the work holder by engagement of the flange portion with the work holder, effecting a seal and preventing the ingress of foreign material and is also supported rearwardly through the portion 23 of the die holder engaging the cylindrical bore 19 of the work holder which also effects a sealing engagement or a two-point support, forwardly and rearwardly, with an intermediate point of support comprising the lead thread 15 of the work holder and the threaded portion 16 of the die head. Thus, the die head is maintained sealed and in alignment both forwardly and rearwardly and foreign material is prevented ingress to the intermediate driving portion and which also forms a third point of support.

Upon reverse movement of the driving ring the die head will be rotated in reverse direction and will move axially outwardly of the work holder and the thread chasers engaging the frusto-conical shoulder of the work holder will be forced radially inwardly to engage the frusto-conical surface 11 and return to operative position to operate upon a second pipe or the like.

Thus it will be seen that I have provided a relatively simple and compact pipe threading apparatus wherein the die holder is supported at three spaced points and is sealed both forwardly and rearwardly against the ingress of foreign material which might interfere with the proper operation of the lead screw and the spaced points of support maintain the die head in rigid and proper alignment to prevent chattering and the like.

Although I have shown and described a preferred embodiment of my invention, I contemplate that numerous and extensive departures may be made therefrom without departing from the spirit of my invention and the scope of the appended claims.

Having thus described my invention, what I claim is:

1. In a pipe threading apparatus, the combination of a work holder adapted to rigidly support work to be operated upon, a rotatable die head threadingly engaging the work holder whereby relative rotatable movement between the die head and work holder will force the die head axially inwardly, means for effecting relative rotary movement between the die head and work holder, thread chasers supported by the die head and movable axially therewith, the thread chasers being adapted to engage the work holder at their radially outer ends, means limiting radial inward movement of the thread chasers and the die head slidingly and sealingly engaging the work holder, both forwardly and rearwardly of the threaded portion.

2. In a screw threading apparatus, a generally tubular work holder adapted to rigidly support an element to be threaded, a die head threadedly engaging the inner wall of the work holder whereby relative rotary movement between the work holder and die head will effect relative axial movement therebetween, a portion of the die head projecting from the work holder having external splines formed thereon, a ratchet ring having portions engaging said splines for rotating the die head, means for restraining axial movement of the ratchet ring relative to the work holder, and means for reversibly driving the ratchet ring.

3. In a screw threading apparatus, a generally tubular work-holder adapted to rigidly support an element to be threaded, a die head threadingly engaging the inner wall of the work holder whereby relative rotary movement between the work-holder and the die head will effect relative axial movement therebetween, a portion of the die head being projected from the work holder, a ratchet ring rotatably mounted on the work-holder and drivingly interconnected with the projecting portion of the die head, said driving connection permitting relative axial movement between the die head and ratchet ring, means restraining the ratchet ring against axial movement and means for reversibly driving the ratchet ring.

4. In a screw threading apparatus, a generally tubular work holder adapted to rigidly support an element to be threaded, a die head slidably engaging the inner wall of the work holder at axially spaced points and threadingly engaging the work holder intermediate said points, thread chasers radially movable in the die head engageable at their radial inner ends with the element to be threaded and retained thereagainst during the threading operation by engagement of their radially outer ends with the work-holder, means limiting radial movement of the thread chasers in the die head, a portion of the die head extending outwardly of the work holder whereby the die head and work holder may be relatively rotated to effect axial movement therebetween, a ratchet ring rotatably mounted on the work holder and restrained against axial movement relative thereto, co-operating inter-locking means on the ratchet ring and projecting portion of the die-head drivingly inter-connecting the ratchet ring and die head, said inter-connecting means permitting relative axial movement between the ratchet ring and die holder, and means for reversibly driving the ratchet ring.

5. In a screw threading apparatus, a generally tubular work holder adapted to rigidly support an element to be threaded, a die head threadingly engaging the inner wall of the work holder whereby relative rotary movement between the work holder and die head will effect relative axial movement therebetween, a plurality of circumferentially spaced and radially movable thread chasers mounted in the die head, the work holder having a portion of the inner wall engageable with the thread chasers to force the thread chasers into cutting engagement with the element to be threaded, said work holder portion terminating in a portion permitting the thread chasers to be forced radially outwardly to discontinue the cutting operation, inter-engaging means on the work holder and thread chasers operably to hold the thread chasers out of engagement with the threaded element at the completion of the threading operation, and means drivingly interconnected with a portion of the die head projecting from the work holder to rotate the die head.

6. In a screw threading apparatus, a generally tubular work holder adapted to rigidly support an element to be threaded, a die head threadingly engaging the inner walls of the work holder whereby relative rotary movement between the work holder and die head will effect relative axial movement therebetween, a portion of the die head projecting from the work holder having external splines formed thereon, a ratchet ring having portions engaging said splines for rotating the die head, means for restraining axial movement of the ratchet ring relative to the work holder, a driving ring associated with the ratchet ring, and means inter-connecting the driving ring and ratchet ring whereby the ratchet ring may be selectively rotated in either direction by the driving ring.

CHRISTIAN A. OVERGUARD.